May 19, 1959     P. G. DE SEE     2,887,120

VALVE

Filed Feb. 25, 1957

INVENTOR.
PETER G. DE SEE
BY Alfred W. Vibber
ATTORNEY.

United States Patent Office 2,887,120
Patented May 19, 1959

2,887,120

VALVE

Peter G. De See, Hawthorne, N.J., assignor to Halkey-Roberts Corporation, Paramus, N.J., a corporation of New Jersey Application February 25, 1957, Serial No. 642,268

10 Claims. (Cl. 137—223)

This invention relates to a valve for transmitting fluid into or out of fluid-containing articles and for checking the passage of such fluid.

This application is a continuation-in-part of application Ser. No. 542,912, filed October 26, 1955, now abandoned.

The valve of the invention, as will be appreciated from the following description of preferred embodiments thereof, is capable of use to advantage in a wide variety of applications and under widely differing conditions. A typical application is as a gas admitting and retaining valve on user-inflated articles, to be described in detail hereinafter. It is to be understood, however, that the valve of the invention displays marked advantages in other uses, such as to allow the exhaustion of gas from a container and the subsequent sealing of the container from the ingress of further gas, and in allowing the admission of a liquid into a hollow article, or the exhaustion of liquid from the article, and the subsequent sealing of the article. The valve is of advantage in all its manners of application because of its simplicity, its ease of operation, its durability, its resistance to attack by corrosive liquids and gases, and by the simplicity of manufacture of its parts and the assembly of its parts with the article in which the valve is to be incorporated.

The valve of the present invention is of simplified construction so that its parts may be molded to final shape and so that but one simple assembly operation is required to complete the valve and to attach it to the wall of a hollow article. In preferred embodiments of the valve of the invention the body of the valve may be directly electronically sealed to the body of the hollow article. The valve is easily opened and closed by reciprocation of the movable part thereof, the valve being open when such part is in its outer position and being closed when the valve part is in its inner position, so that pushing or punching the valve from the outside of the article tends to close the valve more tightly. The valve of the invention is of such construction that when it is in its closed position it is of markedly reduced height, tending to telescope into the article. Preferably both parts of the valve, that is, the relatively fixed body portion or part thereof and the movable part thereof are made of elastic plastic material so that the valve does not tend to cut or seal to the opposite wall of the inflatable article when pressed against it for long periods of time, does not tend to puncture the article even though the valve should be stepped on or pressed against the opposite side of the article, and does not scratch the floor or furniture.

The valve of the present invention, in preferred embodiments thereof, is provided with a relatively fixed body portion sealed into an opening in a hollow article. Preferably such body portion is in the form of an inwardly converging frusto-conical portion. Cooperating with the body portion and circumferentially sealed thereto is a flexible outer cover portion, which is convex and preferably reversely frusto-conical when the valve is open, which is deformable and movable to an inner retracted position wherein portions thereof are in telescoped relation and the outer valve part is telescoped within and stably interfits with the inner valve part. The outer valve part carries a manipulating stem, whereby such outer part of the valve may be pulled out into valve-open position, in which the outer part of the valve is outwardly convex, or pushed into retracted, valve-closed position in which such outer valve part is partially turned inside out and lies telescoped within the hollow of the inner part of the valve.

In the preferred embodiments of the valve shown herein, the stem thereof is hollow and serves as a passage for inflating and deflating the article. A port or passage, in series with the opening through the valve stem, positioned in one part of the valve and a plug-like member on the other part of the valve confronting such port or passage cooperate with each other. The plug-like member is withdrawn from the passage when the outer valve part is in convex, valve-open position, and the plug-like member sealingly interfits with the passage when the outer valve part is pushed in to retract it into valve-closed position. The plug-like member also serves as a pilot to properly guide the outer member into a properly flexed and sealed closed position.

As will be apparent hereinafter, the valve and its parts are so constructed that they may be simply molded and easily assembled not only to each other but also to the side wall of the article in which the valve is to be incorporated. Preferably the inner and outer parts of the valve are molded integral with each other and are so related as to be able to be folded into confronting relationship with each other and positioned on the article at the opening in the wall thereof, whereby the parts of the valve are sealed to each other and the valve is sealed to the article in one sealing operation. In addition to simplifying the assembly of the valve, such construction facilitates the storage and counting of the valve parts, since one is always assured of having the same number of inner and outer valve parts.

The invention has among its objects the provision of an improved, simplified, easily made and operated fluid-transmitting and checking valve, the provision of such valve which, in a preferred embodiment, has the parts thereof integral before assembly so that a part or parts of the valve can not be lost therefrom, the provision of a valve wherein the body portion adapted to be sealed into an opening in a wall of an inflatable article is markedly strengthened against distortion by tensional forces in the wall of the article, and the provision of a valve of the above indicated character in which the assembly of the valve consists simply of a superimposition of the parts of the valve and the edge sealing of them together, such assembly and sealing operation preferably taking place at the same time as the assembly of the valve on the hollow article and the sealing of the valve to the wall thereof.

Further objects of the invention, in preferred embodiments thereof, reside in the provision of a one-piece valve, the parts of which are integrally molded to finished shape, and in the provision of a positive-acting one-piece valve which is opened and closed by a simple straight line motion, the valve being closed when the movable element is in its inner position and opened when the movable element is in its outer position, the outer valve part, when in valve-closed position, lying appreciably telescoped within the inner valve part.

The above and further objects of the invention relating to economies of manufacture, assembly, and use, will become apparent in the following description of preferred embodiments thereof. In the accompanying drawing, forming part of this specification:

Figure 1:
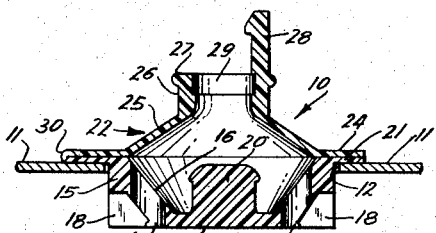
Fig. 1 is a view generally in axial section through the valve of a first preferred embodiment of the invention, the valve being shown in open position, a fragment of the wall of the inflated article in which the valve is incorporated being shown in section, the section being taken generally along a line indicated at 1—1 in Fig. 3.
Figure 2:
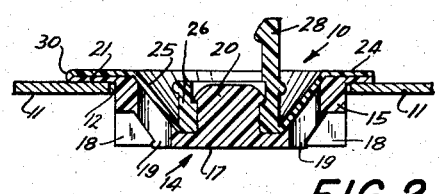
Fig. 2 is a generally axial section similar to Fig. 1, the valve being shown in closed position.
Figure 3:
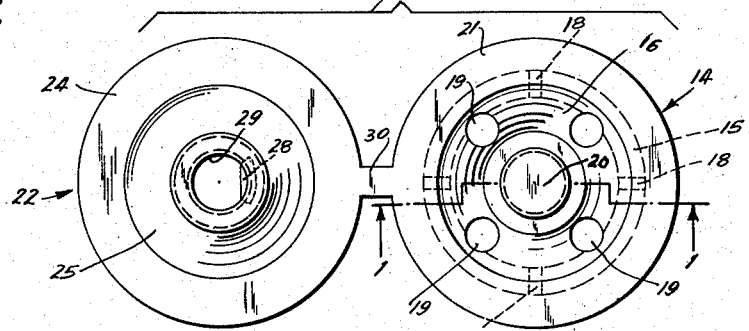
Fig. 3 is a plan of a blank for assembling the valve of Figs. 1 and 2, the blank being in a flat, as-molded condition.

As will be apparent from the above, there are shown and described herein two preferred embodiments of the valve of the invention, the first such embodiment being shown in Figs. 1–3, inclusive, and the second embodiment being shown in Figs. 4–7, inclusive.

The first embodiment of the valve of the invention illustrated herein is designated generally by the character 10. Such valve is shown, in Figs. 1 and 2, as being incorporated and sealed to the wall 11 of an inflated article at the hole 12 in the latter. Valve 10 has an inner part, generally designated 14, having an annular ring-like portion 15, from which the side wall 16 tapers radially inwardly toward the axis of the valve and inwardly of the inflated article in a frusto-conical portion configuration. The side wall 16 of valve portion 14 is completed by the transverse inner end wall 17. The side wall 16 has at least one opening therethrough (four shown) communicating with the central space within the valve. Preferably a plurality of such holes or passages 19, extending through the frusto-conical side wall portion 16 of the inner valve part, are employed. The end wall 17 of the inner valve part carries a circular cylindrical plug-like member 20, centrally located thereon, and projecting inwardly of the space within the valve body.

The side wall 16 of inner valve portion 14 is provided, in the embodiment shown, with four equally spaced radially outwardly and axially downwardly projecting broad fins or flanges 18 terminating outwardly flush with the outer edge of annular portion 15 and at their lower ends flush with the bottom of end portion 17. Members 15 and 18 function to stiffen side wall 16 against undue distortion upon manipulation of the valve to open and closed positions, and to prevent any marked distortion of valve part 14 by tensions imposed thereon by wall 11 of the inflatable article. Outwardly of ring-like member 15, valve portion 14 has a thin circumferential flange 21, adapted to overlie and to be sealed to the wall 11 of the inflatable article.

The valve 10 has an outer portion generally designated 22 having a circumferential flange 24 thereon confronting the flange 21, and an outwardly convex (when the valve is in open position) side wall portion 25 which is preferably of frusto-conical configuration. Projecting outwardly centrally of the smaller end of side wall 25 is the stem 26 having the circumferential bead 27 thereon, and having a central opening or passage 29 therethrough. An upstanding tab 28, integrally attached to stem 26 at one side thereof, facilitates the pulling of outer valve portion 22 from the closed position of Fig. 2 into the open position of Fig. 1.

When the hollow article is to be inflated, the stem 26 of the valve is pulled outwardly into the position of Fig. 1 and fluid under pressure is introduced into the space within the valve body through the passage 29 in the stem. Such fluid flows from the space within the valve body through the openings 19 into the interior of the hollow article. When such article has been sufficiently inflated, the introduction of fluid is stopped and the upper valve portion 22 is retracted into the position of Fig. 2 by thrusting inwardly on the stem 26. The frusto-conical side wall portion 25 of the outer valve portion is thus turned at least partially inside out, so that it lies stably in telescoped relationship within the similarly shaped side wall portion 16 of the inner valve part, and the stem 26 lies at least partially telescoped within the thus retracted and turned side wall portion 25 of the outer valve part.

In such retracted position of the outer valve part, the plug-like member 20 enters the inner end of the passage 29. Member 20 somewhat exceeds in diameter the diameter of the passage so that a tight seal is effected between them. In this embodiment of the valve, as in that of Figs. 4–7, inclusive, to be described, the zone of primary sealing between the valve parts is that between the plug-like member and the port or passage which it enters. The free end of plug-like member 20, may, if desired, be of slightly enlarged diameter, as shown, so as to insure a tight seal between the valve parts when the valve is closed.

The valve 10 is made of deformable elastic plastic material, the parts of the valve being preferably molded in the flat condition illustrated at 10′ in Fig. 3. As there shown, the valve parts 14 and 22 are integrally connected by a thin flexible strap-like member 30 attached to the flanges 21 and 24 of the respective valve parts at one zone thereof. Preferably the valve part 22 is molded with the parts thereof in their inner, retracted position, as such part is shown in Fig. 2. This aids in the stable retention of the part 22 in such retracted position when the valve is closed. After the blank 10′ is thus molded, the valve part 22 is folded up into confronting relationship with the inner valve part 14, as shown in Fig. 1, and the thus folded valve blank is superimposed on the side wall of the hollow article 11 at the opening 12 therethrough. The parts 14 and 22 of the valve are now sealed together, and the valve is also sealed to the side wall of the hollow article, preferably in one operation.

Although it is to be understood the invention is not restricted thereto, the blank 10′ for the valve is preferably molded from polyvinyl chloride, which is relatively soft and elastic but is sufficiently stiff to be self-sustaining. Other suitable deformable elastic plastic material may, of course, be used for making the valve parts. The use of polyvinyl chloride is of advantage when the wall of the hollow article is also made of polyvinyl chloride, since the valve body may then readily be heat sealed to the article by the use of conventional high frequency electronic sealing apparatus. When the valve blank and the hollow article are made in the above described preferred manner, the parts 14 and 22 of the valve may be heat sealed to each other at the same time that the valve is heat sealed to the wall of the article 11.

Figure 5:
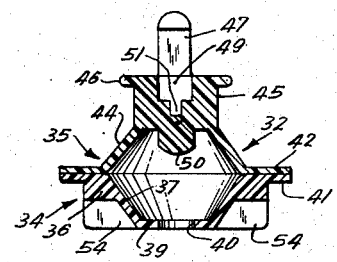
Fig. 5 is a view generally in axial section similar to Fig. 4, the section being displaced 90° from that of Fig. 4.
Figure 6:
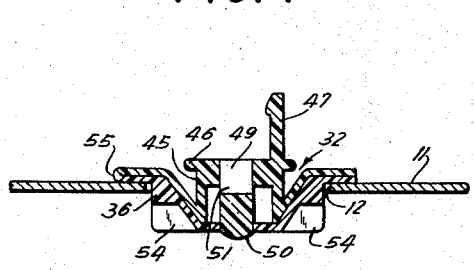
Fig. 6 is a view similar to Fig. 4, but with the valve in closed position.
Figure 7:
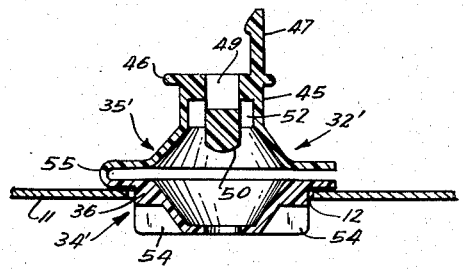
Fig. 7 is an exploded view generally in axial section through the parts of the valve of the second illustrated embodiment thereof, the view showing the valve prior to the sealing of the valve parts together and prior to the sealing of the valve to the wall of a hollow article in which it is to be incorporated.

In Figs. 4–7, inclusive, the assembled valve is generally designated by the character 32. In Fig. 7 the folded valve blank shown is designated 32′. As shown, the valve 32 is adapted to be sealed to the side wall 11 of a hollow, inflatable article by being introduced within the opening 12 in the wall of the article and by having a circumferentially extending flange on the valve sealed to the wall of the article.

The valve 32 is made up of an inner valve part 34 and an outer valve part 35, which are of generally similar external configuration in the portions thereof immediately confronting each other. The inner portion 34 of the valve has a circumferential ring-like formation 36 from which the side wall 37 tapers inwardly in a frusto-conical formation, the inner end of portion 34 having a transverse bottom or inner wall 39 with a circular central passage 40 therethrough. A thin circumferentially extending flange 41, which extends outwardly from member 36, is adapted to overlie and to be sealed to side wall 11 of the inflatable article.

The outer portion 35 of the valve has a flange 42 which is of substantially the same size and shape as flange 41, a side wall portion 44 which is outwardly convex and frusto-conical when the valve is in open position, and an outwardly directed cylindrical stem 45 having bead 46 on its outer edge. A tab 47, integrally connected to stem 45, aids in the pulling of the outer valve part from the closed position of Fig. 6 into the open position of Fig. 4.

The stem 45 has a central opening 49 therein. Positioned across the opening 49, inwardly of the outer valve portion 35, is the plug-like member 50 which confronts the port or passage 39 in the inner valve part 34. Communication between the hollow interior of the valve 32 and the inflating and deflating opening 49 in the stem 45 is afforded by the transverse passage 51 inwardly of the opening 49 in the stem and the inwardly directed side passages 52 at the ends of passage 51.

Figure 4:
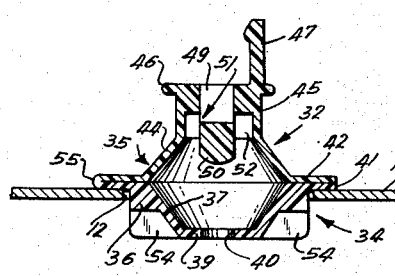
Fig. 4 is a view generally in axial section through a valve of a second preferred embodiment of the invention, the valve being shown in open position.

The manner of operation of the valve both during the inflating and deflating operations will readily be understood by consideration of Figs. 4, 5 and 6. When the article is to be inflated, the stem 45 is pulled into the outer position shown in Figs. 4 and 5, so that the side wall portion 44 of the outer valve part 35 is outwardly convex, and the plug-like member 50 lies spaced from the passage 39 in the inner valve part. Fluid under pressure is then introduced into the valve through the opening 49 in the stem thereof, such fluid flowing through the passage 51 into the side passages 52, the central space within the valve, and inwardly to the interior of the hollow article through the passage 39. When the hollow article has been sufficiently inflated, the flow of air is stopped and the stem 45 of the valve is pushed inwardly, so that the side wall portion 44 of the outer valve part 35 is at least partially telescoped within the frusto-conical wall portion 37 of the inner valve part 34, at least the inner portion of the stem 45 of the valve lies telescoped within the portion of the side wall 44 of the outer valve part, and the plug-like member 50 lies sealingly engaged within the passage 39 in the inner valve part.

The configuration of the side wall portion of valve parts 34 and 35 is such that side wall portion 44 is stably held in its retracted, inside out, position shown in Fig. 6. In such position, the stem 45 is of markedly less radial height than it is in the position of Fig. 4. Preferably, the plug-like member 50 has a diameter appreciably exceeding the diameter of the passage 39, so that not only is the passage in the valve tightly sealed when the valve is in position of Fig. 6, but the friction between the plug-like member 50 and the passage 39 aids in retaining the outer valve portion stably in the closed position of Fig. 6 against what may be quite appreciable pressures within the hollow inflatable article.

In one preferred embodiment of the valve of Figs. 4-7, inclusive, the passage 39 has a diameter of .208 inch, and the plug-like member 50 has a diameter of .218 inch. To give the side wall of the inner valve portion 34 increased stiffness, it is preferably provided with equally spaced fins or ribs 54, which, as shown, are similar to members 18 of the first described embodiment. To facilitate assembly of the inner and outer valve parts, such parts are preferably integrally molded, being connected by a tongue which is folded upon assembly of the valve parts, as shown at 55.

Although the valve of the invention has been described primarily in application wherein it admits, exhausts, and prevents the passage of gas, it is to be understood that it may also be employed in applications where it is in contact with and/or seals against the passage of liquids. In its preferred embodiments wherein both parts of the valve are molded of plastic material, the valve is particularly of value for use where it comes into contact with corrosive media. Thus, the valve may be used for long periods while submerged in or in contact with sea water without any deterioration of the valve parts. When used for evacuating hollow articles, such as containers for Army Services' blankets, the valve is self-sealing.

Whereas for purposes of illustration I have shown and described preferred embodiments of the valve of the invention and of its manner of use, it is to be understood that such embodiments are illustrative only, since the invention is capable of considerable variation as to details. The valve of the invention is, therefore, to be defined by the scope of the claims appended hereto.

What is claimed is:

1. A valve of the character described, comprising a first valve member made of elastic plastic material movable to an outer extended position to form a convex tube-like means for conducting fluid, said first valve member being movable from said extended position to an inner retracted position wherein portions thereof are in telescoped relation, and a second valve member lying inwardly of the first valve member, said second valve member having a concavity facing the first valve member and receiving the inner portion of the first valve member when the latter is moved to its inner retracted position, one of said valve members having a generally central fluid conducting passage therethrough communicating with the space between the first and second valve members and the other of said valve members having fluid conducting passage means in communication with the space between the first and second valve members and a plug-like member thereon confronting said generally central fluid conducting passage and spaced therefrom when the first valve member is in extended position, the plug-like member being sealingly engageable within the generally central fluid conducting passage when the first valve member is in retracted position.

2. An inflation valve, comprising a first valve member made of elastic plastic material movable to an outer extended position to form a convex tube-like means for conducting fluid, said first valve means being movable from said extended position to an inner retracted position wherein portions thereof are in telescoped relation, and a second valve member lying inwardly of the first valve member in generally coaxial confronting relationship therewith, said second valve member having a concavity facing the first valve member, the two valve members interfitting when the first valve member is in retracted position, one of said valve members having a generally central fluid conducting passage therethrough communicating with the space between the first and second valve members and the other of said valve members having fluid conducting passage means in communication with the space between the first and second valve members and a plug-like member thereon confronting said generally central fluid conducting passage and spaced therefrom when the first valve member is in extended position, the plug-like member being sealingly engageable in the generally central fluid conducting passage when the first valve member is in retracted position.

3. An inflation valve which comprises a circumferentially flanged hollow body having outer and inner halves which are oppositely concave when the valve is in open position, the outer valve half being made of elastic plastic material, a generally centrally disposed outwardly directed hollow stem on the outer valve half communicating with the central space between the valve halves, one of said valve halves having a generally central fluid conducting passage therethrough communicating with such central space and the other of said valve halves having fluid conducting passage means in communication with the central space between the inner and outer valve members and a plug-like member thereon confronting said generally central fluid conducting passage and spaced therefrom when the valve is in open position, the outer valve half being movable from its extended open position to an inner retracted position in which portions thereof are telescoped within the inner valve half and the plug-like member extends into and is sealingly engaged with the inner end of the generally central fluid conducting passage.

4. An inflation valve which comprises a circumferentially flanged hollow body having outer and inner halves which are oppositely concave and have inner side walls which are oppositely directed and frusto-conical when the valve is in open position, the outer valve half being made of elastically deformable plastic material, a generally centrally disposed outwardly directed hollow stem on the outer valve half communicating with the central space between the valve halves, one of said valve halves having a generally central fluid conducting passage therethrough communicating with such central space and the other of said valve halves having fluid conducting passage means in communication with the central space between the inner and outer valve members and a plug-like member thereon confronting said generally central fluid conducting passage and spaced therefrom when the valve is in open position, the outer valve half being movable from its extended open position to an inner retracted position in which its side wall is turned inside out and lies snugly and stably telescoped within the inner valve half, the valve stem lies partially retracted within the thus turned outer valve half, and the plug-like member extends into and is sealingly engaged with the inner end of the generally central fluid conducting passage.

5. A valve of the character described, comprising a first, elastically deformable valve member movable to an extended position to form tube-like means for conducting fluid, said first valve member being movable from said extended position to an inner retracted position wherein portions thereof are in telescoped relation, and a second valve member lying inwardly of the first valve member, the first and second valve members being oppositely concave and having inner side walls which are oppositely directed and frusto-conical when the valve is in open position, said second valve member having a generally central fluid conducting passage therethrough communicating with the space between the first and second members and the first valve member having fluid conducting passage means in communication with the space between the first and second valve members and a passage-closing member thereon confronting said generally central fluid conducting passage and spaced therefrom when the first valve member is in extended position, the passage-closing member being sealingly engageable with the generally central fluid conducting passage when the first valve member is in retracted position.

6. A valve of the character described, comprising a first, elastically deformable valve member movable to an extended position to form tube-like means for conducting fluid, said first valve member being movable from said extended position to an inner retracted position wherein portions thereof are in telescoped relation, and a second valve member lying inwardly of the first valve member, the first and second valve members being oppositely concave and having inner side walls which are oppositely directed and frusto-conical when the valve is in open position, said first member having a generally central fluid conducting passage therethrough communicating with the space between the first and second members and the second valve member having fluid conducting passage means in communication with the space between the first and second valve members and a passage-closing member thereon confronting said generally central fluid conducting passage and spaced therefrom when the first valve member is in extended position, the plug-like member being sealingly engageable with the generally central fluid conducting passage when the first valve member is in retracted position.

7. An inflation valve, comprising a first, deformable valve member made of elastic plastic material movable to an outer extended position to form a convex tube-like means for conducting fluid, said first valve member being movable from said extended position to an inner retracted position wherein portions thereof are in telescoped relation, and a second valve member lying inwardly of the first valve member in generally coaxial confronting relationship therewith, the first and second valve members being oppositely concave and having inner side walls which are oppositely directed and frusto-conical when the valve is in open position, the two valve members interfitting when the first valve member is in retracted position, the second valve member having a generally central fluid conducting passage therethrough communicating with the space between the first and second valve members, the first valve member having fluid conducting passage means in communication with the space between the first and second valve members, and the first valve member having a plug-like member thereon confronting said generally central fluid conducting passage and spaced therefrom when the first valve member is in extended position, the plug-like member being sealingly engageable in the generally central fluid conducting passage when the first valve member is in retracted position.

8. An inflation valve, comprising a first, deformable valve member made of elastic plastic material movable to an outer extended position to form a convex tube-like means for conducting fluid, said first valve member being movable from said extended position to an inner retracted position wherein portions thereof are in telescoped relation, and a second valve member lying inwardly of the first valve member in generally coaxial confronting relationship therewith, the first and second valve members being oppositely concave and having inner side walls which are oppositely directed and frusto-conical when the valve is in open position, the two valve members telescopically interfitting when the first valve member is in retracted position, the first valve member having a generally central fluid conducting passage therethrough communicating with the space between the first and second valve members, having fluid conducting passage means in communication with the space between the first and second valve members, and the second valve member having a plug-like member thereon confronting said generally central fluid conducting passage and spaced therefrom when the first valve member is in extended position, the plug-like member being sealingly engageable in the generally central fluid conducting passage when the first valve member is in retracted position.

9. An inflation valve which comprises a body having outer and inner halves which are oppositely convex and have inner side walls which are concave, oppositely directed, and frusto-conical when the valve is in open position, the valve halves each having a circumferential flange, the flanges confronting each other and being sealed together, the outer valve half being made of elastically deformable plastic material, a generally centrally disposed outwardly directed hollow stem on the outer valve half communicating with the central space between the valve halves, the inner valve half having a generally central fluid conducting passage therethrough communicating with such central space and being imperforate except for said passage and the outer valve half having fluid conducting passage means in communication with the central space between the inner and outer valve halves and a plug-like member thereon confronting said passage and spaced therefrom when the valve is in open position, the outer valve half being movable from its extended open position to an inner retracted position in which its side wall is turned inside out and lies snugly and stably telescoped within the inner valve half, the valve stem lies partially retracted within the thus turned outer valve half, and the plug-like member extends into and is sealingly engaged with the inner end of the generally central fluid conducting passage.

10. An inflation valve which comprises a body having outer and inner halves which are oppositely convex and have inner side walls which are concave, oppositely directed, and frusto-conical when the valve is in open position, the valve halves each having a circumferential flange, the flanges confronting each other and being sealed together, the outer valve half being made of elastically deformable plastic material, a generally centrally disposed outwardly directed hollow stem on the outer valve half communicating with the central space between the valve halves, the outer valve half having a generally central fluid conducting passage therethrough communicating with such central space, the inner valve half having a plug-like member thereon confronting said generally central fluid conducting passage and spaced therefrom when the valve is in open position, the inner valve half having at least one opening therethrough spaced from the plug-like member, the outer valve half being movable from its extended open position to an inner retracted position in which its side wall is turned inside out and lies snugly and stably telescoped within the inner valve half, the valve stem lies partially retracted within the thus turned outer valve half, and the plug-like member extends into and is sealingly engaged with the inner end of the generally central fluid conducting passage.

References Cited in the file of this patent
UNITED STATES PATENTS

| | | |
|---|---|---|
| 2,044,913 | Miller | June 23, 1936 |
| 2,246,621 | Davis | June 24, 1941 |
| 2,638,613 | Gunther | May 19, 1953 |
| 2,690,861 | Tupper | Oct. 5, 1954 |
| 2,710,622 | Chupa | June 14, 1955 |